US012468740B2

(12) United States Patent
Mosenia et al.

(10) Patent No.: US 12,468,740 B2
(45) Date of Patent: Nov. 11, 2025

(54) CATEGORY RECOMMENDATION WITH IMPLICIT ITEM FEEDBACK

(71) Applicant: GOOGLE LLC, Mountain View, CA (US)

(72) Inventors: Arsalan Mosenia, Los Angeles, CA (US); Anandsudhakar Kesari, Palo Alto, CA (US); Yanli Cai, Sunnyvale, CA (US); Anurag Vyas, San Jose, CA (US); Monica Chawathe Lenart, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 201 days.

(21) Appl. No.: 18/062,635

(22) Filed: Dec. 7, 2022

(65) Prior Publication Data

US 2024/0020321 A1    Jan. 18, 2024

Related U.S. Application Data

(63) Continuation of application No. PCT/US2022/073837, filed on Jul. 18, 2022.

(51) Int. Cl.
*G06F 16/28* (2019.01)
*G06F 16/2457* (2019.01)

(52) U.S. Cl.
CPC ...... *G06F 16/287* (2019.01); *G06F 16/24578* (2019.01)

(58) Field of Classification Search
CPC ................ G06F 16/287; G06F 16/24578
See application file for complete search history.

(56) References Cited

U.S. PATENT DOCUMENTS 6,785,671 B1 *  8/2004  Bailey .................... G06Q 30/02
                                                     707/999.005
7,769,752 B1 *  8/2010  Turner .................. G06F 16/358
                                                     707/731

(Continued)

OTHER PUBLICATIONS

Li et al., "Concept Mining via Embedding", 2018 IEEE International Conference on Data Mining (ICDM), (Year: 2018).*

(Continued)

*Primary Examiner* — Syed H Hasan
*Assistant Examiner* — Robert F May
(74) *Attorney, Agent, or Firm* — Brake Hughes Bellermann LLP

(57) ABSTRACT

Techniques of providing category recommendations include a category recommendation system that provides users recommended categories based on implicit data (e.g., user-item interactions) and/or explicit data (e.g., queries, user information). The recommendations can be personalized or non-personalized (i.e., depending if user embeddings are used), queried or non-queried (i.e., depending on whether query embeddings are used), or personalized and queried (if both user and query embeddings are used). In any of these cases, there is an offline mode and a serving mode. In the offline mode, a category embedding is generated from an aggregation of item embeddings associated with a candidate category. In the serving mode, the candidate category is selected for display on a user device based on a similarity between the category embedding and either, or both, of the user embedding and the query embedding.

20 Claims, 8 Drawing Sheets

(56) References Cited

U.S. PATENT DOCUMENTS

| | | | | |
|---|---|---|---|---|
| 8,762,326 | B1* | 6/2014 | Zhou | G06F 16/9535 |
| | | | | 707/899 |
| 10,198,524 | B1* | 2/2019 | Amalapurapu | G06F 16/958 |
| 2002/0156763 | A1* | 10/2002 | Marchisio | G06F 40/279 |
| 2011/0179081 | A1* | 7/2011 | Ovsjanikov | G06F 16/9538 |
| | | | | 707/769 |
| 2014/0089321 | A1* | 3/2014 | Engel | G06Q 50/12 |
| | | | | 707/748 |
| 2018/0285774 | A1* | 10/2018 | Soni | G06Q 50/01 |
| 2019/0355011 | A1* | 11/2019 | Pustejovsky | G06N 20/00 |
| 2021/0174164 | A1 | 6/2021 | Hsieh et al. | |
| 2021/0342697 | A1 | 11/2021 | Fang et al. | |
| 2023/0035337 | A1* | 2/2023 | Tan | G06F 16/9024 |
| 2023/0059006 | A1* | 2/2023 | Yoo | G06Q 30/02 |
| 2023/0135683 | A1* | 5/2023 | Balasubramanian | |
| | | | | G06Q 30/0625 |
| | | | | 705/26.7 |
| 2023/0177585 | A1* | 6/2023 | Mani | G06Q 30/0631 |
| | | | | 705/26.7 |

OTHER PUBLICATIONS

International Search Report and Written Opinion for PCT Application No. PCT/US2022/073837, mailed on Feb. 10, 2023, 14 pages.
Li, et al., "Concept Mining via Embedding", 2018 IEEE International Conference on Data Mining, 2018, 10 pages.
Zhuang, et al., "Representation Learning via Dual-Autoencoder for Recommendation", Neural Networks, vol. 90; doi: 10.1016/j.neunet.2017.03.009, 2017, pp. 83-89.

* cited by examiner

Related Searches 170 hamburger recipes ground beef recipes steak recipes barbeque recipes high protein recipes American food recipes pub food recipes

---

160

How to make a great burger

About 420,000,000 results (0.48 seconds)

Perfect Burger Recipe

Natasha's Kitchen
5.0 ★★★★★ (54)

30 min
Dill pickle, cheddar cheese, tomato, red onion, ground beef,

Steakhouse Burgers

Once Upon a Chef
5.0 ★★★★★ (54)

25 min
Lean ground beef, worcestershire sauce, ketchup

CATEGORY RECOMMENDATION WITH IMPLICIT ITEM FEEDBACK

CROSS REFERENCE TO RELATED APPLICATION

This application is a bypass continuation application of PCT Application No. PCT/US2022/073837, filed Jul. 18, 2022, the disclosure of which is incorporated herein by reference in its entirety.

BACKGROUND

Some recommender systems provide recommendations to users based on the input received from the users. Some input is explicit (e.g., ratings, selections of specific preferences), while other input is implicit (e.g., clicks, views, swipes, skips, etc.). For example, some video service providers recommend videos to users based on explicit feedback such as star ratings. Such video services may also provide recommendations based on implicit feedback such as viewing time.

SUMMARY

Implementations described herein are related to providing users recommended categories based on implicit data (e.g., user-item interactions) and/or explicit data (e.g., queries, user information). For example, a user whose search history includes recipes for hamburgers, chicken wings, and baby-back ribs might receive recommendations of categories such as American recipes, pub food recipes, BBQ recipes, and so on based on prior user interaction data and/or queries associating recipes for hamburgers, chicken wings, and baby-back ribs with the terms "American," "pub food," "BBQ," and so on. The recommendations can be personalized or non-personalized (i.e., depending on whether user embeddings are used), queried or non-queried (i.e., depending on whether query embeddings are used), or personalized and queried (i.e., when both user and query embeddings are used). In any of these cases, there is an offline mode and a serving mode. In the offline mode, a category embedding is generated from an aggregation of item embeddings associated with a candidate category. In the serving mode, the candidate category is selected for display on a user device based on a similarity between the category embedding and either, or both, of the user embedding and the query embedding.

In one general aspect, a computer-based method can include generating a plurality of category embeddings by, for each candidate category of a plurality of candidate categories, selecting a respective subset of item embeddings that correspond to that candidate category; and aggregating the respective subset of item embeddings to produce a category embedding for that candidate category. The method can also include selecting a set of categories based on a similarity between category embeddings for categories of the set of categories and at least one of a user embedding representing a user or a query embedding representing a query. The method can further include providing, for display on a user device, the set of categories.

In another general aspect, a computer program product comprises a non-transitory storage medium, the computer program product including code that, when executed by processing circuitry of a computing device, causes the processing circuitry to perform a method. The method can include generating a plurality of category embeddings by, for each candidate category of a plurality of candidate categories, selecting a respective subset of item embeddings that correspond to that candidate category; and aggregating the respective subset of item embeddings to produce a category embedding for that candidate category. The method can also include selecting a set of categories based on a similarity between category embeddings for categories of the set of categories and at least one of a user embedding representing a user or a query embedding representing a query. The method can further include providing, for display on a user device, the set of categories.

In another general aspect, an electronic apparatus comprises memory and controlling circuitry coupled to the memory. The controlling circuitry can be configured to generate a plurality of category embeddings by, for each candidate category of a plurality of candidate categories by being further configured to select a respective subset of item embeddings that correspond to that candidate category; and aggregate the respective subset of item embeddings to produce a category embedding for that candidate category. The controlling circuitry can also be configured to select a set of categories based on a similarity between category embeddings for categories of the set of categories and at least one of a user embedding representing a user or a query embedding representing a query. The controlling circuitry can further be configured to provide, for a display on a user device, the set of categories.

The details of one or more implementations are set forth in the accompanying drawings and the description below. Other features will be apparent from the description and drawings, and from the claims.

BRIEF DESCRIPTION OF THE DRAWINGS

FIG. 1B is a diagram that illustrates an example set of categories displayed to a user, resulting from a search query.

DETAILED DESCRIPTION

Conventional recommendation systems offer recommended items based on user feedback. This may be done by mapping items and users to a latent space (embedding space) and then computing a similarity measure between users and items in the latent space.

For example, when a user has a browsing history that includes clicks on hamburger recipes and a rib recipes, a search system may return other, hamburger and rib recipes, with maybe some other closely-related recipes depending on the browsing history, e.g., a beef taco recipe, grilled sausage recipe, relish recipe, etc.

A technical problem with the above-described conventional recommendation systems is that the recommended results are limited in scope. For example, even in the above example in which the recommendation system provided recipes other than the hamburger or rib recipes, the options offered by the recommendation system only cover what the user might probably enjoy given the items on which the user clicked. It is unlikely that the user will be prompted to explore other items the user may enjoy but cannot be determined from the browsing history and/or other implicit and explicit feedback.

In accordance with the implementations described herein, a technical solution to the above-described technical problem includes a category recommendation system that provides users recommended categories based on implicit data (e.g., user-item interactions) and/or explicit data (e.g., queries, user information). For example, a user whose search history includes recipes for hamburgers and ribs might receive recommendations of categories such as American recipes, pub food recipes, BBQ recipes, and so on. The recommendations can be personalized or non-personalized (i.e., depending on whether user embeddings are used), queried or non-queried (i.e., depending on whether query embeddings are used), or personalized and queried (i.e., when both user and query embeddings are used). In any of these cases, there is an offline mode and a serving mode. In the offline mode, a category embedding is generated from an aggregation of item embeddings associated with a candidate category. In the serving mode, the candidate category is selected for display on a user device based on a similarity between the category embedding and either, or both, of the user embedding and the query embedding.

A technical advantage of disclosed implementations is that, in contrast to the conventional recommendation systems, the above-described category recommendation system expands recommendations to include whole families of items not provided using the conventional recommendation systems. For example, providing whole families of items represented by categories of recipes such as American recipes, pub food recipes, and/or BBQ recipes broadens the scope of recommendation systems to feature new families of items that are likely missed by the conventional recommendation systems that merely provide a few related, individual items.

Figure 1A:
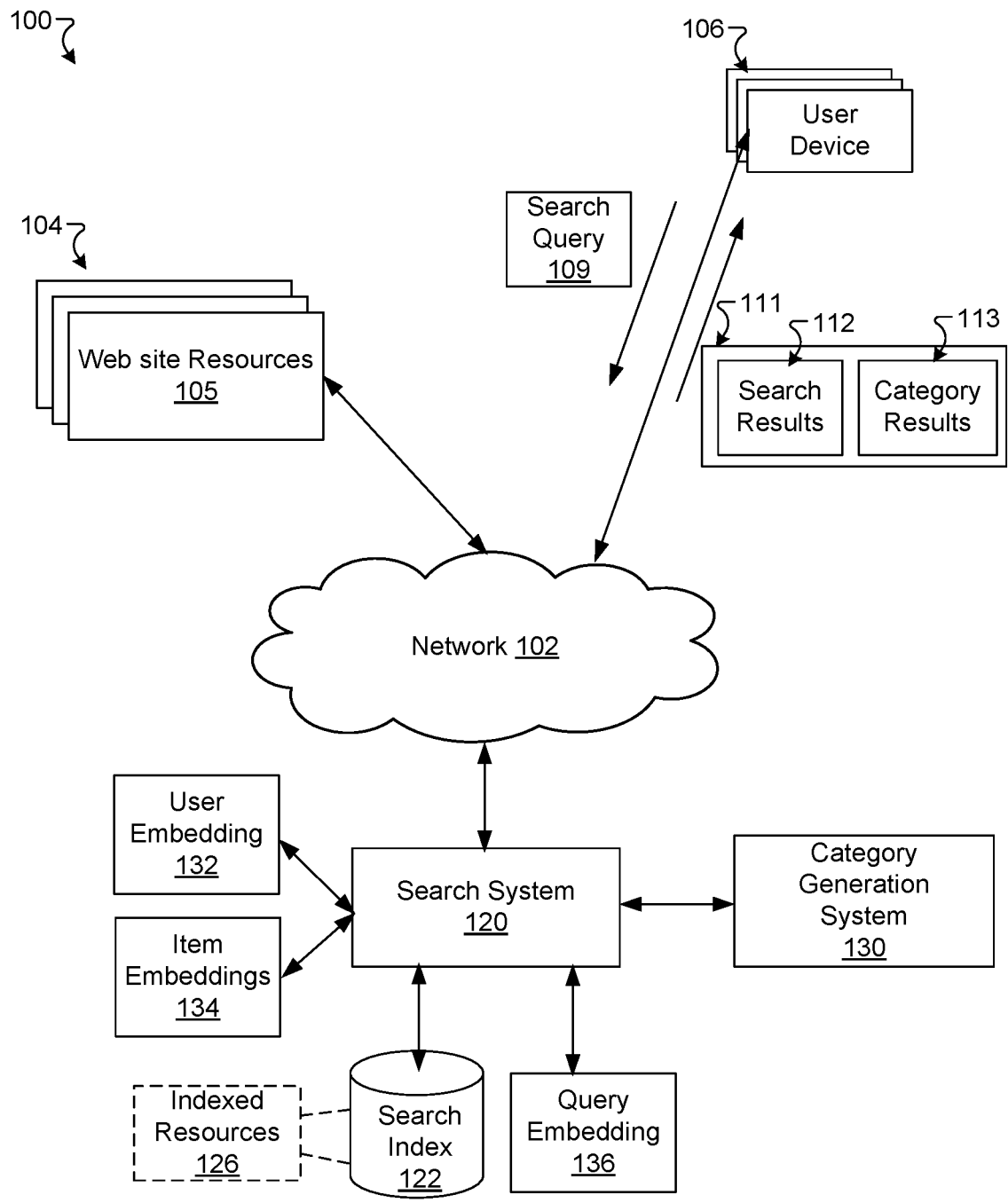
FIG. 1A is a diagram that illustrates an example search engine in which improved techniques described herein may be implemented.

FIG. 1A depicts an example environment 100 in which users can interact with one or more computer-implemented search services. Example computer-implemented search services can include a search service for an electronic mail service, a chat service, a document sharing service, a calendar sharing service, a photo sharing service, a video sharing service, a shopping service, a blogging service, a micro-blogging service, a social networking service, a location (location-aware) service, a check-in service and/or a ratings and review service. In the example of FIG. 1A, an Internet search service is depicted, which is discussed in further detail herein. It is appreciated, however, that implementations of the present disclosure can include one or more computer-implemented services, such as the examples discussed herein.

With continued reference to FIG. 1A, a search engine 120 provides search services. The example environment 100 includes a network 102, e.g., a local area network (LAN), wide area network (WAN), the Internet, or a combination thereof, connects web site 104, user devices 106, and the search engine 120. In some examples, the network 102 can be accessed over a wired and/or a wireless communications link. For example, mobile computing devices, such as smartphones can utilize a cellular network to access the network. The environment 100 may include millions of web site 104 and user devices 106.

In some examples, a web site 104 is provided as web site resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site. Web site resources 105 can be static or dynamic.

In some examples, web site resources 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is under control of a user and is capable of requesting and receiving resources 105 over the network 102. Example user devices 106 include personal computers, mobile computing devices, e.g., smartphones, wearable devices, and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device, as are wearables and other smart devices such as smart speakers. A user device 106 typically includes a user application, e.g., a web browser, to facilitate the sending and receiving of data over the network 102.

In some examples, to facilitate searching of resources 105, the search engine 120 identifies the resources 105 by crawling and indexing the resources 105 provided on web site 104. Data about the resources 105 can be indexed based on the resource to which the data corresponds. The indexed and, optionally, cached copies of the resources 105 are stored in a search index 122, e.g., as indexed resources 126.

The user devices 106 submit search query 109 to the search engine 120. In some examples, a user device 106 can include one or more input modalities. Example modalities can include a keyboard, a touchscreen, and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search engine 120 accesses the search index 122 to identify resources 105 that are relevant to, e.g., have at least a minimum specified relevance score for, the search query 109. The search engine 120 identifies the resources 105, generates a search result display 111 that includes search result 112 identifying resources 105, and returns the search result display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., JavaScript-html, plaintext.

A search result 112 is data generated by the search engine 120 that identifies a web site resource 105 that is responsive to a particular search query, and includes a link to the web site resource 105. An example search result 112 can include a web page title, a snippet of text or a portion of an image extracted from the web page, and the URL of the web page. In some examples, data provided in the search result 112 can be retrieved from a resource data store. For example, the search engine 120 can provide the search result display 111, which displays the search result 112. In some examples, the search result display 111 can be populated with information, e.g., a web page title, a snippet of text or a portion of an image extracted from the web page, that is provided from the resource data store.

In accordance with implementations of the present disclosure, the example environment 100 also includes a category recommendation system 130 communicably coupled to the search engine 120, e.g., directly coupled or coupled over a network such as network 102. In some examples, and in the case of multiple computer-implemented services, the category recommendation system 130 is communicably coupled to respective systems that provide functionality of the respective computer-implemented services. In some examples, the systems, e.g., the search engine 120, can interact with the category recommendation system 130 to provide category results 113 displayed in a browser window running the search engine 120, as discussed in further detail herein.

To enable the category recommendation system 130, the search engine 120 has access to user embeddings 132, item embeddings 134, and query embeddings 136 stored on respective storage. Each of the user embeddings 132 is a vector of values representing different attributes and/or characteristics of a user and is generated from, e.g., respective user data (e.g., user's location, preferences, etc., obtained with user consent). In some implementations, the user embeddings 132 are generated using a supervised learning engine such as a dual encoder in concert with items. Each of the item embeddings 134 is a vector of values representing various attributes and/or characteristics of an item and is generated from, e.g., item data/item interaction data (item descriptors and/or identifiers, history of interaction by a user or users). In some implementations, the item embeddings 134 are generated using a supervised learning engine such as a dual encoder in concert with users or queries Each of the query embeddings 136 is a vector of values representing a query, generated from respective query data (representation of text, image, audio, video, tactile, etc. information provided as a query or in response to a query provided to a search engine). In some implementations, the query embeddings 136 are generated using a supervised learning engine such as a dual encoder in concert with items.

A supervised machine learning algorithm maps the user data, item data, and query data to their respective embeddings such that the respective embeddings are usually of a significantly smaller dimension than the data. In some implementations, the mapping of user and item/item interaction data generated item embeddings 134 and user embeddings 132 into a common latent space. A latent space is an embedding space in which the embedding vectors are arranged by similarity measure to each other. Mapping the data vectors into a latent space for their embeddings simplifies the selection of users and items that are likely compatible. In some implementations, the mapping of query and item/item interaction data generated item embeddings 134 and query embeddings 136 into a common latent space.

FIG. 1B is a diagram that illustrates a user interface 150 in which an example set of category results 113 is displayed on the user device 106. As shown in FIG. 1B, the user interface 150 is split into two sections 160 and 170.

The section 160 displays a search bar in which a user inputs a query composed of text, or in some implementations, an image, audio, a video, or the like. As shown in FIG. 1B, an example query is the text, "How to make a great burger." A conventional search system may return example search results as shown in FIG. 1B, entitled "Perfect Burger Recipe" and "Steakhouse Burgers," with websites, star ratings, and a brief description. The conventional search engine may also include some more links to websites in which the user is likely to be interested.

The section 170, however, includes a set of categories entitled "Related Searches" as shown in FIG. 1B. This is an output of the search engine 120 As shown in FIG. 1B, the related searches are categories generated and selected by the category recommendation system 130. In this example, the displayed categories include "hamburger recipes," "ground beef recipes," "steak recipes" "barbeque recipes," "high protein recipes," "American food recipes", and "pub food recipes." These categories provide the user with a far more diverse set of items of likely further interest than using the conventional search engine. For example, when the user clicks on "ground beef recipes," that category may provide a new set of links including taco recipes, sloppy joe recipes, escalloped macaroni recipes, and so on. When the user clicks on High protein recipes," that may provide another new set of links including chicken recipes, tofu recipes, and insect recipes. The search engine 120 accordingly provides links to recipes that may have some similarity to the query (or user) but would not likely be presented by a conventional search engine.

Figure 2:
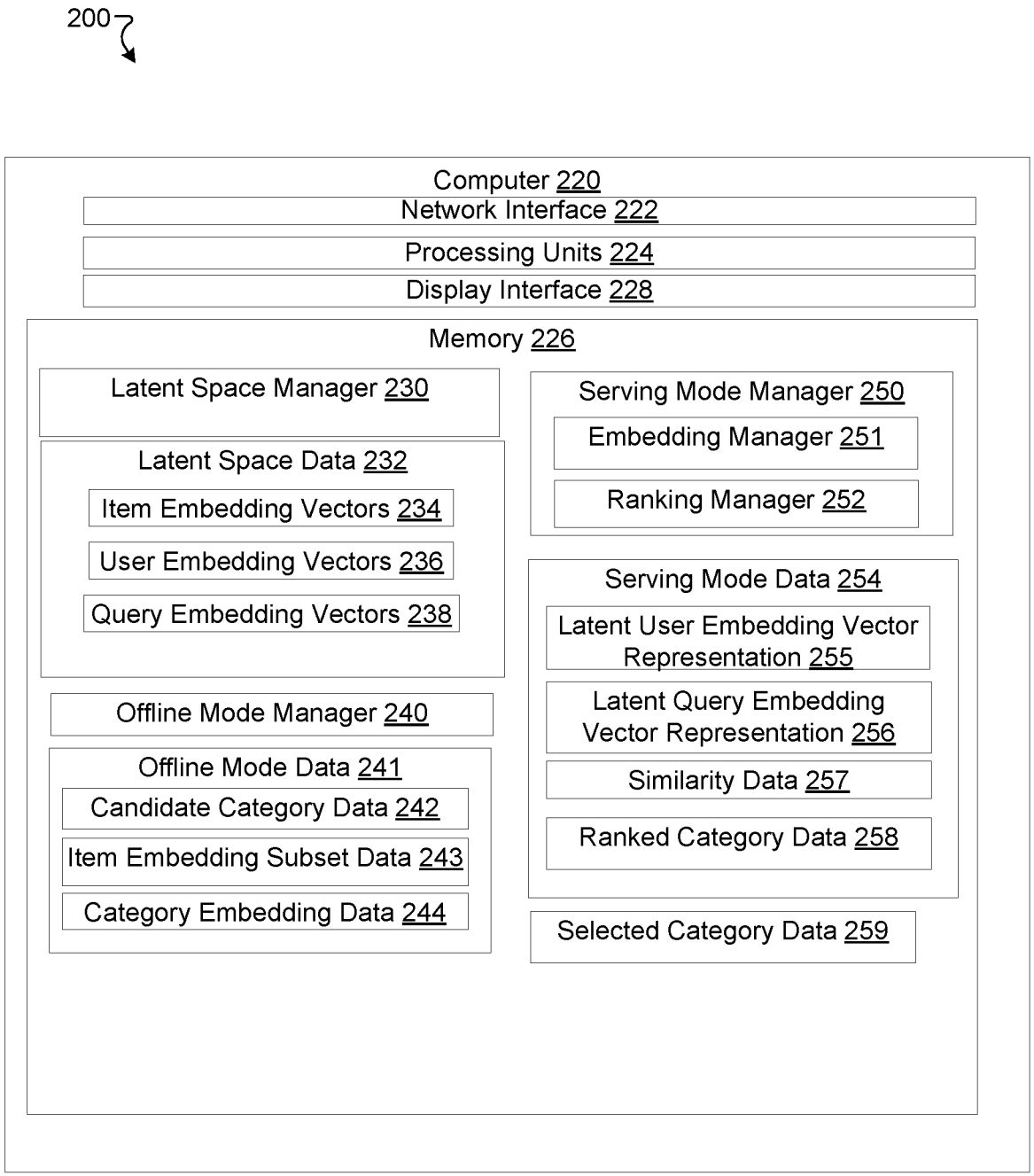
FIG. 2 is a diagram that illustrates an example electronic environment in which the improved techniques described herein may be implemented.

FIG. 2 is a diagram that illustrates an example environment 200 in which the above-described technical solution may be implemented. The example environment 200 includes a computer 220 configured to produce categories for display to a user device in response to a query from a user.

The computer 220 includes a network interface 222, a set of processing units 224, memory 226, and a display interface 228. The network interface 222 includes, for example, Ethernet adaptors, Token Ring adaptors, and the like, for converting electronic and/or optical signals received from the network to electronic form for use by the computer 220. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form controlling circuitry, which is configured and arranged to carry out various methods and functions as described herein. The display interface 228 is configured to provide data to a display device for rendering and display to a user.

In some implementations, one or more of the components of the computer 220 can be, or can include processors (e.g., processing units 224) configured to process instructions stored in the memory 226. Examples of such instructions as depicted in FIG. 2 include a latent space manager 230, an offline mode manager 240, and a serving mode manager 250. Further, as illustrated in FIG. 2, the memory 226 is configured to store various data, which is described with respect to the respective managers that use such data.

The latent space manager 230 is configured to produce latent space data 232 from items, users, and queries. The latent space manager 230 is configured to form item embedding vectors 234, user embedding vectors 236, and query embedding vectors 238 based on item, user, and query data available to the latent space manager 230. In some implementations, the latent space manager 230 receives the item, user, and query data over the network interface 222, i.e., over a network.

An item embedding vector 234 is a representation of an item with which a user has or users have interacted. As described earlier, in some implementations the item embedding vector 234 is a result of a supervised machine learning engine with the item data as input. In some implementations, the item embedding vector 234 includes a vector of values and has a dimension significantly less than the input item data. In such implementations, the supervised machine learning engine performs a compression in such a way that similar items have similar embedding vectors, e.g., by computing a similarity (distance) measure between pairs of item embedding vectors 234. In some implementations, an item embedding vector 234 is an input item vector. In such an implementation, an item embedding vector 234 has binary values, with each value corresponding to, e.g., an item descriptor (e.g., size, weight, purpose, etc.).

User embedding vectors 236 are a representations of users. In some implementations, the user embedding vectors 236 may be formed from user data that includes explicit descriptions of the users. Examples of explicit descriptions are those provided by the users, e.g., user settings in a browser. In some implementations, the user embedding vectors 236 may be formed from user data including implicit descriptions of the user. An implicit description is a description not provided directly by a user but rather through computer instructions that perform observations of/analysis of data accessed by the user operating a computer running those instructions. Put another way, implicit descriptions of the user are descriptions derived from a user's interaction with a computing device or system. Examples of implicit descriptions include geolocation, interaction data (i.e., data generated by a user with respect to an item by e.g., viewing, clicking, highlighting, etc.) including number of clicks and mouse movement data, amount of time spent with item in an active window, and the like.

In some implementations, the user embedding vectors 236 include a vector of values and has a dimension significantly less than the input user data that is input into a supervised machine learning engine. In such implementations, the supervised machine learning engine performs a compression in such a way that similar users have similar embedding vectors, e.g., by computing a similarity (distance) measure between pairs of user embedding vectors 236. In some implementations, the user embedding vectors 236 include an input user vector. In such an implementation, the user embedding vectors 238 has binary values, with each value corresponding to, e.g., an explicit or implicit user descriptor.

Moreover, in some implementations, the supervised machine learning engine maps item embedding vectors 234 and the user embedding vectors 236 to the same latent space. Accordingly, when item embedding vectors 234 and user embedding vectors 236 are in the same latent space, there is a high likelihood of users represented by the user embedding vectors 236 producing items represented by item embedding vectors 234. An advantage of mapping data across the same latent space is that is reduces the amount of and simplifies the processing necessary to perform, Query embedding vectors 238 are representations of query data input by users. As described earlier, in some implementations the query embedding vectors 238 are a result of a supervised machine learning engine with the query data as input. In some implementations, the query embedding vectors 238 include vectors of values and have a dimension significantly less than the input query data. In such implementations, the supervised machine learning engine performs a compression in such a way that similar queries have similar embedding vectors, e.g., by computing a similarity (distance) measure between pairs of query embedding vectors 238. In some implementations, the query embedding vectors 238 are an input item vector. In such an implementation, query embedding vectors 238 have binary values, with each value corresponding to, e.g., an item descriptor (e.g., size, weight, purpose, etc.).

Moreover, in some implementations, the supervised machine learning engine maps item embedding vectors 234 and the query embedding vectors 238 to the same latent space. As discussed previously, a latent space is an embedding space in which the embedding vectors are arranged by similarity measure to each other. Accordingly, when item embedding vectors 234 and query embedding vectors 238 are in the same latent space, there is a high likelihood of queries represented by the query embedding vectors 238 producing items represented by item embedding vectors 234.

The offline mode manager 240 is configured to generate offline model data 241, specifically category embedding data 244, from candidate category data 242 and item embedding subset data 243. The category embedding data 244 is then an input for the serving mode manager 250 which provides the category links displayed to the user in a browser window. Details of the offline mode manager 240 are illustrated with regard to FIG. 3.

Figure 3:
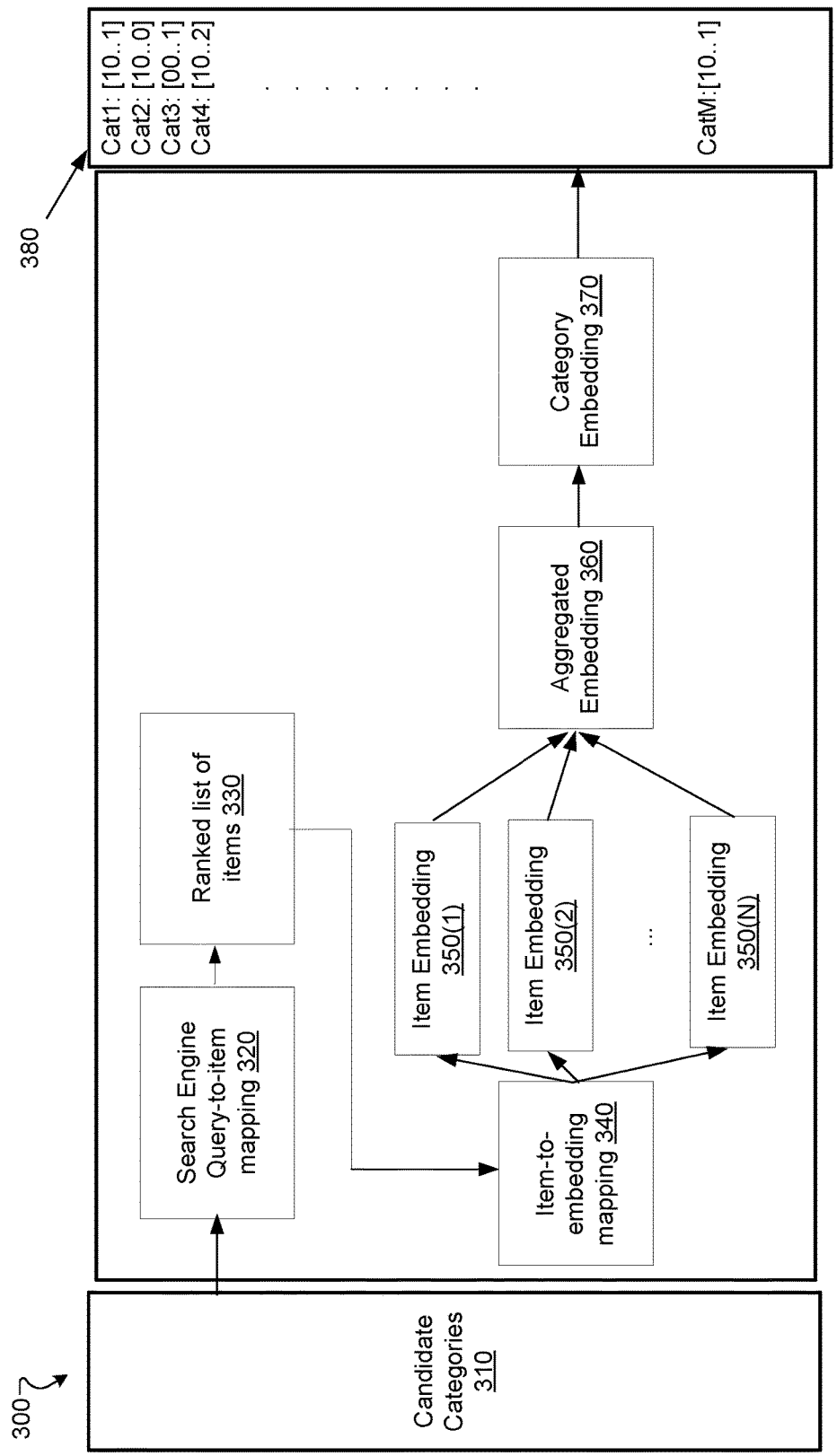
FIG. 3 is a flow diagram that illustrates an example offline mode of a category generation system.

FIG. 3 is a flow diagram 300 that illustrates an example offline mode of a category generation system (e.g., offline mode manager 240). As shown in FIG. 3, the offline mode has as an input a plurality of candidate categories 310 and, as an output at 370, a plurality of category embeddings 380.

The plurality of candidate categories 310 may include a list (set, plurality) of possible categories that may be presented to the user. The candidate categories may originate from a pool of categories defined and developed over time. In some implementations, each of the plurality of candidate categories is represented by a text string. This is not limiting, however, and in some implementations, each of the plurality of candidate categories is represented by an image, an audio clip, a video clip, tactile feedback, or the like. In some implementations, each of the plurality of candidate categories 310 is defined by a category label provided manually. In some implementations, each of the plurality of candidate categories 310 may be defined using a machine learning process.

At 320, the offline mode manager 240 is configured to provide each of the plurality of candidate categories 310 as a search string into a search engine (e.g., search engine 120) and obtain a respective search result for the category provided. The search result corresponds to a candidate category of the plurality of candidate categories 310. That is, each of the candidate categories has, as a result of the search at 320, a respective query-to-item mapping. For example, when a first candidate category "hamburger recipes" is input into a search engine, the search engine returns a first list of items from the input "hamburger recipes." When a second candidate category "barbeque recipes" is input into the search engine, the search engine returns a second list of items from the input "barbeque recipes." This process of inputting a candidate category of the plurality of candidate categories 310 into the search engine and returning a corresponding list of search results repeats for each of the plurality of candidate categories 310.

At 330, the offline mode manager 240 is configured to, for each of the candidate categories 310, rank the list of search results corresponding to that candidate category. In some implementations, the offline mode manager 240 performs the ranking according to a metric of relevance to that candidate category (input query).

At 340, the offline mode manager 240 is configured to, for each of the candidate categories 310, select item embeddings for a subset of the ranked items for that candidate category to form item embedding subset data 243. In some implementations, the offline mode manager 240 generates item embedding vectors for top-N ranked items, where N is a specified number, e.g., 25, 50, 100, etc. In some implementations, the item embedding vectors 234 form item embedding subset data 243. As shown in FIG. 3, the item embedding subset data 243 takes the form, for each candidate category, of item embeddings 350(1), 350(2), . . . , 350(N).

At 360, the offline mode manager 240 is configured to, for each of the candidate categories 310, aggregate the item embeddings 350(1), 350(2), . . . , 350(N) to form an aggregated embedding. In some implementations, aggregating includes summing. In some implementations, aggregating includes forming an arithmetic mean of item embedding vectors representing the item embeddings 350(1), 350(2), . . . , 350(N). In some implementations, aggregating includes summing or forming a median of item embedding vectors representing the item embeddings 350(1), 350(2), . . . , 350(N). In some implementations, aggregating includes forming a normalized average/sum/median of item embedding vectors representing the item embeddings 350(1), 350(2), . . . , 350(N), or in other words normalizing the aggregated embedding. In some implementations, aggregating includes selecting an item embedding, e.g., item embedding 350(J), having the smallest distance from a query embedding vector based on the query that produced the list of items for each of the candidate categories 310. For example, the distance may be based on a similarity metric such as an inner product or cosine metric. In some implementations, aggregating includes forming a weighted average of item embedding vectors representing the item embeddings 350(1), 350(2), . . . , 350(N).

At 370, the offline mode manager 240 is configured to, for each of the candidate categories 310, form, for that candidate category, a category embedding of the category embeddings 380 from the aggregated embedding. That is, in some implementations, the aggregated item embedding vector for a candidate category is represented in the category embeddings 380, e.g., a respective category embedding for the candidate category.

As shown in FIG. 3, the output of the offline mode is category embedding of the category embeddings 380 corresponding to a respective candidate category of the plurality of candidate categories 310.

Returning to FIG. 2, the serving mode manager 250 is configured to produce selected category data 259 by selecting a set of the category embeddings 380 (i.e., category embedding data 244) in order to display the categories corresponding to the category embeddings in a browser window displayed on the user device 106. How the set of category embeddings is selected is based on serving mode data 254. As shown in FIG. 2, the serving mode manager 250 includes an embedding manager 251 and a ranking manager 252.

Serving mode data 254 includes an indication of whether the set of category embeddings is based on user embedding vectors 236 or query embedding vectors 238, or both. Details of the selection of the set of category embeddings by the serving mode manager 250 is detailed in FIG. 4.

Figure 4:
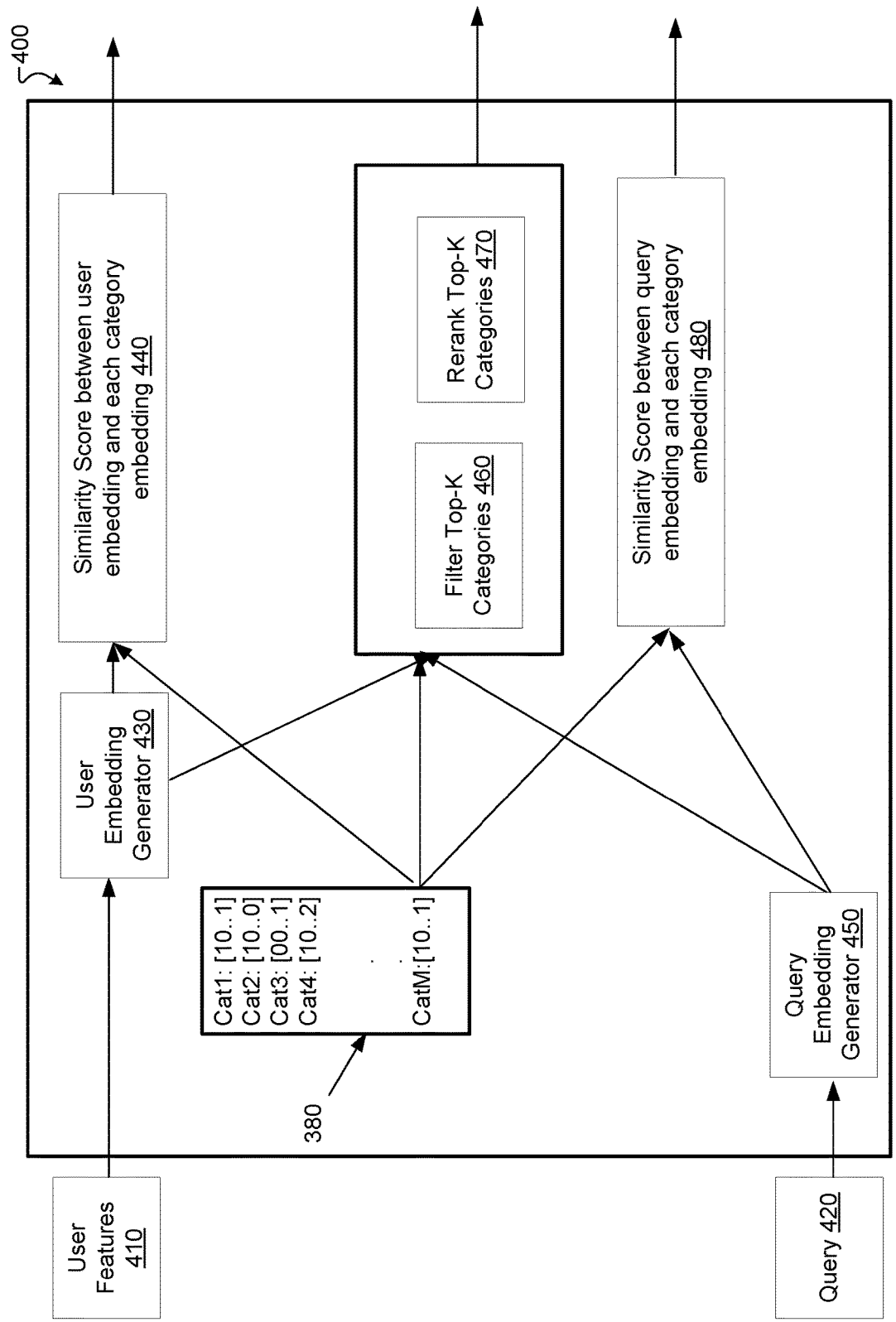
FIG. 4 is a flow diagram that illustrates an example serving mode of a category generation system.

FIG. 4 is a diagram 400 that illustrates an example serving mode of a category generation system. As shown in FIG. 4, the embedding manager 251 takes as input one or both of user feature data 410 and query data 420. The user feature data 410 represents the user inputting the query represented by the query data 420. In some implementations, the user feature data 410 takes the form of a binary vector indicating the presence or absence of binary user features. In some implementations, the query data 420 takes the form of a text string. In some implementations, the query data 420 takes the form of an image, an audio clip, a video clip, or tactile input.

As shown in FIG. 4, the embedding manager 251 is configured to input the user feature data 410 into a user embedding generator 430 to produce a latent user embedding vector representation 255 from the latent space in which the user embedding vectors 236 and item embedding vectors 234 are located. A latent space, also known as a latent feature space or embedding space, is a representation of compressed data in a high-dimensional space (e.g., 127 or 256 dimensions), were similar data points are closer together in space. The latent user/Item embeddings can be generated using user-item interactions and dual-encoder (also, known as two-tower model) architecture.

As shown in FIG. 4, the embedding manager 251 is configured to input the query data 420 into a query embedding generator 450 to produce a latent query embedding vector representation 256 from the latent space in which the query embedding vectors 238 and item embedding vectors 234 are located. Query embeddings can be generated in different ways, including but not limited to, (1) aggregating the embeddings of the items returned by the Search engine for the particular query, (2) aggregating the embeddings of the words used in the query.

In some implementations in which the serving mode data 254 indicates that the selected categories are based on the user feature data 410 alone, the embedding manager 251 only uses the user feature data 410. Accordingly, in such an implementation, the latent query embedding vector representation 256 representation is not generated.

In the implementations in which the serving mode data 254 indicates that the selected categories are based on the user feature data 410 alone, the ranking manager 252 inputs the latent user embedding vector representation 255 and each of the of category embeddings 380 into a similarity score engine 440 to produce, as similarity data 257, a similarity score between the latent user embedding vector representation 255 and that category embedding of the category embeddings 380. That is, if there are M category embeddings in the category embeddings 380, then there are M similarity scores, each of which corresponds to a category embedding. The ranking manager 252 then at 480 selects a specified number K of optimal/greatest similarity scores and produces as the ranked category data 258 a ranking of the plurality of category embeddings by similarity score, i.e., a set of optimal similarity scores. The selected category data 259 represents the categories to which the top K similarity scores between the latent user embedding vector representation 255 and the category embeddings 380.

In some implementations, the similarity score is based on a similarity measure. In some implementations, the similarity measure includes an inner product between the user embedding vector representation 255 and a category embedding. An inner product in this context is a sum over products of corresponding vector elements. In some implementations, the similarity measure includes a cosine of an angle between the user embedding vector representation 255 and a category embedding. In some implementations, the top K similarity scores are chosen based on a specified threshold value, e.g., the similarity scores greater than the specified threshold. Other similar methods of determining a similarity score may be used.

In some implementations in which the serving mode data 254 indicates that the selected categories are based on the query data 420 alone, the embedding manager 251 only uses the query data 420. Accordingly, in such an implementation, the user embedding vector representation 255 is not generated.

In the implementations in which the serving mode data 254 indicates that the selected categories are based on the query data 420 alone, the ranking manager 252 inputs the latent query embedding vector representation 256 and each of the category embeddings 380 into a similarity score engine 440 to produce, as similarity data 257, a similarity score between the latent query embedding vector representation 256 and that category embedding of the category embeddings 380. That is, if there are M category embeddings in the category embeddings 380, then there are M similarity scores, each of which corresponds to a category embedding. The ranking manager 252 at 480 then selects a specified number K of greatest similarity scores and produces as the ranked category data 258 a ranking of the plurality of category embeddings by similarity score, i.e., a set of highest-ranked similarity scores. The selected category data 259 represents the categories to which the top K similarity scores between the latent query embedding vector representation 256 and the category embeddings 380.

In some implementations, the similarity score is based on a similarity measure. In some implementations, the similarity measure includes an inner product between the latent query embedding vector representation 256 and a category embedding. An inner product in this context is a sum over products of corresponding vector elements. In some implementations, the similarity measure includes a cosine of an angle between the latent query embedding vector representation 256 and a category embedding.

In some implementations in which the serving mode data 254 indicates that the selected categories are based on both the user feature data 410 and the query data 420, the embedding manager 251 uses both the user feature data 410 and the query data 420. Accordingly, in such an implementation, the user embedding vector representation 255 and the latent query embedding vector representation 256 are generated.

In the implementations in which the serving mode data 254 indicates that the selected categories are based on both the user feature data 410 and the query data 420, the ranking manager 252 may operate on the latent query embedding vector representation 256 first or the user embedding vector representation 255 first.

In the former case, the ranking manager 252 inputs the latent query embedding vector representation 256 and each of the plurality of category embeddings 380 into a similarity score engine 440 to produce, as similarity data 257, a first similarity score between the latent query embedding vector representation 256 and that category embedding of the category embeddings 380. That is, if there are M category embeddings in the category embeddings 380, then there are M similarity scores, each of which corresponds to a category embedding. The ranking manager 252 then produces at 460 an interim ranking of the plurality of category embeddings by first similarity score. The ranking manager 252 then at 470 selects the top K/highest ranked interim category embeddings based on similarity scores. In addition, the ranking manager 252 re-ranks the top K category embeddings based on second similarity scores between the latent user embedding vector representation 255 and the top K/highest ranked interim category embeddings to produce the ranked category data 258.

It is noted that the first similarity score and the second similarity scores do not need to be computed using the same similarity metric. For example, the first similarity score may be based on an inner product while the second similarity score is based on a cosine, or vice-versa.

In the latter case, the ranking manager 252 inputs the latent user embedding vector representation 255 and each of the category embeddings 380 into a similarity score engine 440 to produce, as similarity data 257, a first similarity score between the latent user embedding vector representation 255 and that category embedding of the category embeddings 380. That is, if there are M category embeddings in the category embeddings 380, then there are M similarity scores, each of which corresponds to a category embedding. The ranking manager 252 then produces at 460 an interim ranking of the plurality of category embeddings by first similarity score. The ranking manager 252 then at 470 selects the top K/highest ranked interim category embeddings based on similarity scores. In addition, the ranking manager 252 re-ranks the top K category embeddings based on second similarity scores between the latent query embedding vector representation 256 and the top K/highest ranked interim category embeddings to produce the ranked category data 258.

In all cases described above with regard to the ranking manager 252, the selected category data 259 is a list of categories to which the elements of the ranked category data 258 correspond.

The components (e.g., modules, processing units 224) of the user device 106 can be configured to operate based on one or more platforms (e.g., one or more similar or different platforms) that can include one or more types of hardware, software, firmware, operating systems, runtime libraries, and/or so forth. In some implementations, the components of the computer 220 can be configured to operate within a cluster of devices (e.g., a server farm). In such an implementation, the functionality and processing of the components of the computer 220 can be distributed to several devices of the cluster of devices.

The components of the computer 220 can be, or can include, any type of hardware and/or software configured to process attributes. In some implementations, one or more portions of the components shown in the components of the computer 220 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 220 can be, or can include, a software module configured for execution by at least one processor (not shown). In some implementations, the functionality of the components can be included in different modules and/or different components than those shown in FIG. 2, including combining functionality illustrated as two components into a single component.

Although not shown, in some implementations, the components of the computer 220 (or portions thereof) can be configured to operate within, for example, a data center (e.g., a cloud computing environment), a computer system, one or more server/host devices, and/or so forth. In some implementations, the components of the computer 220 (or portions thereof) can be configured to operate within a network. Thus, the components of the computer 220 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search engine 120 can be, or can include, processors configured to process instructions stored in a memory. For example, latent space manager 230 (and/or a portion thereof), an offline mode manager 240 (and/or a portion thereof), and a serving mode manager 250 (and/or a portion thereof).

In some implementations, the memory 226 can be any type of memory such as a random-access memory, a disk drive memory, flash memory, and/or so forth. In some implementations, the memory 226 can be implemented as more than one memory component (e.g., more than one RAM component or disk drive memory) associated with the components of the computer 220. In some implementations, the memory 226 can be a database memory. In some implementations, the memory 226 can be, or can include, a non-local memory. For example, the memory 226 can be, or can include, a memory shared by multiple devices (not shown). In some implementations, the memory 226 can be associated with a server device (not shown) within a network and configured to serve the components of the computer 220. The memory 226 may be a nontransitory storage device or a transitory storage device that causes the processing circuitry (e.g., processing units 224) to carry out a method 500 as described with regard to FIG. 5. As illustrated in FIG. 2, the memory 226 is configured to store various data, including latent space data 232, offline mode data 241, and serving mode data 254.

Figure 5:
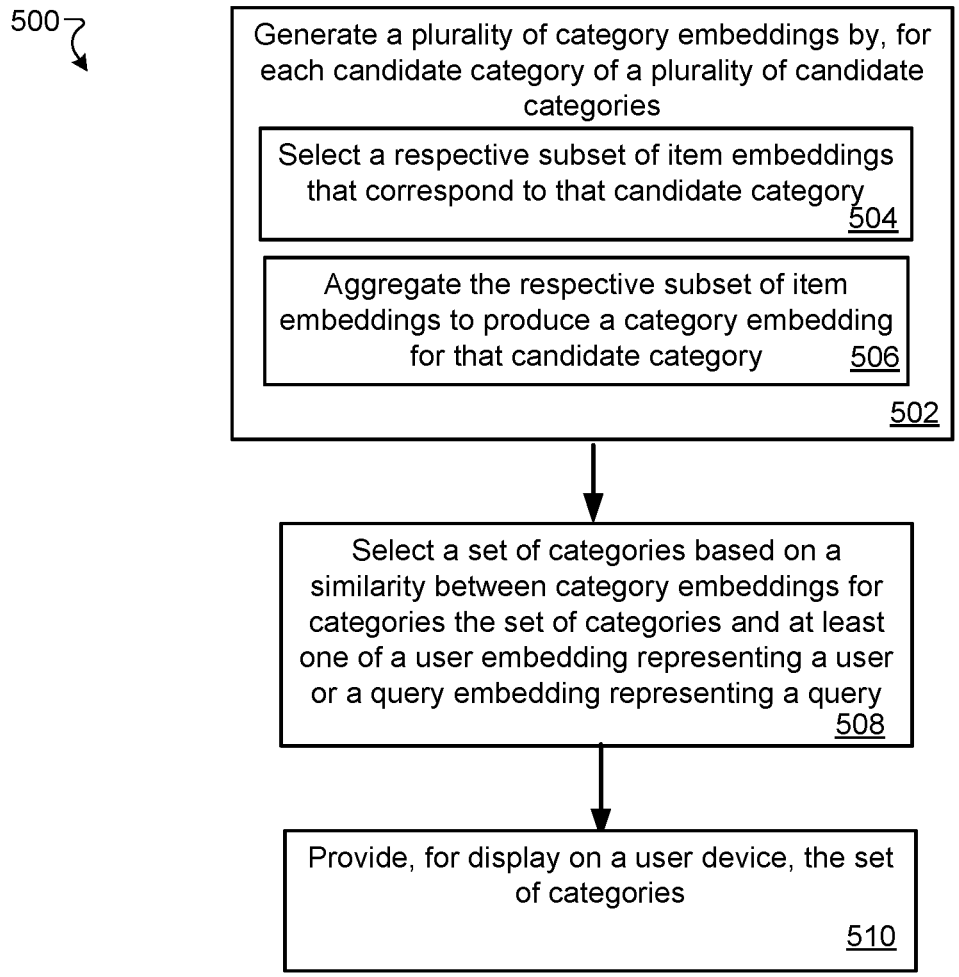
FIG. 5 is a flow chart that illustrates an example method of generating categories, according to disclosed implementations.

FIG. 5 is a flow chart depicting an example method 500 according to the above-described improved techniques. The method 500 may be performed by software constructs described in connection with FIG. 2, which reside in memory 226 of the computer 220 and are run by the set of processing units 224.

At 502, the offline mode manager 240 generates a plurality of category embeddings (i.e., category embeddings 380) by, at 504, for each candidate category of a plurality of candidate categories, selecting a respective subset of item embeddings that correspond to that candidate category (i.e., item embedding subset data 243), and at 506 aggregating the respective subset of item embeddings to produce a category embedding for that candidate category.

At 508, the ranking manager 252 selects a set of categories (e.g., selected category data 259) based on a similarity (e.g., similarity data 257) between category embeddings for categories the set of categories and at least one of a user embedding representing a user (e.g., latent user embedding vector representation 255) or a query embedding representing a query (e.g., latent query embedding vector representation 256).

At 510, the computer 220 provides, for display on a user device (e.g., user device 106), the set of categories.

Figure 6:
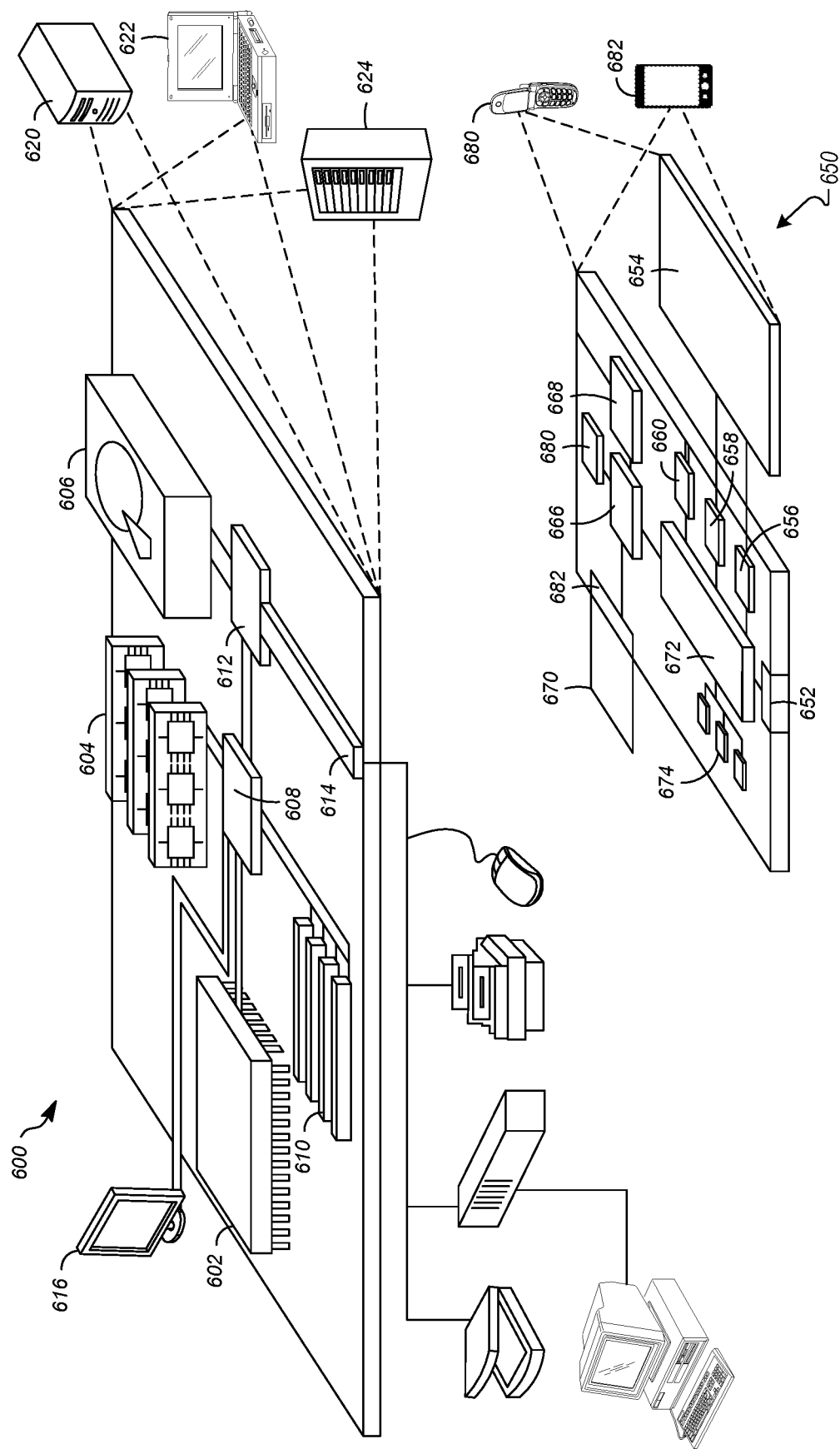
FIG. 6 is a diagram that illustrates an example of a computer device and a mobile computer device that can be used to implement the described techniques.

FIG. 6 illustrates an example of a generic computer device 600 and a generic mobile computer device 650, which may be used with the techniques described here. Computer device 600 is one example configuration of search engine 120 and/or category recommendation system 130 of FIG. 1A and computer 220 of FIG. 2.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions are examples only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 660 may be provided in communication with processor 652, so as to enable near area communication of device 650 with other devices. External interface 660 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SWIM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 660.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Figure 7:
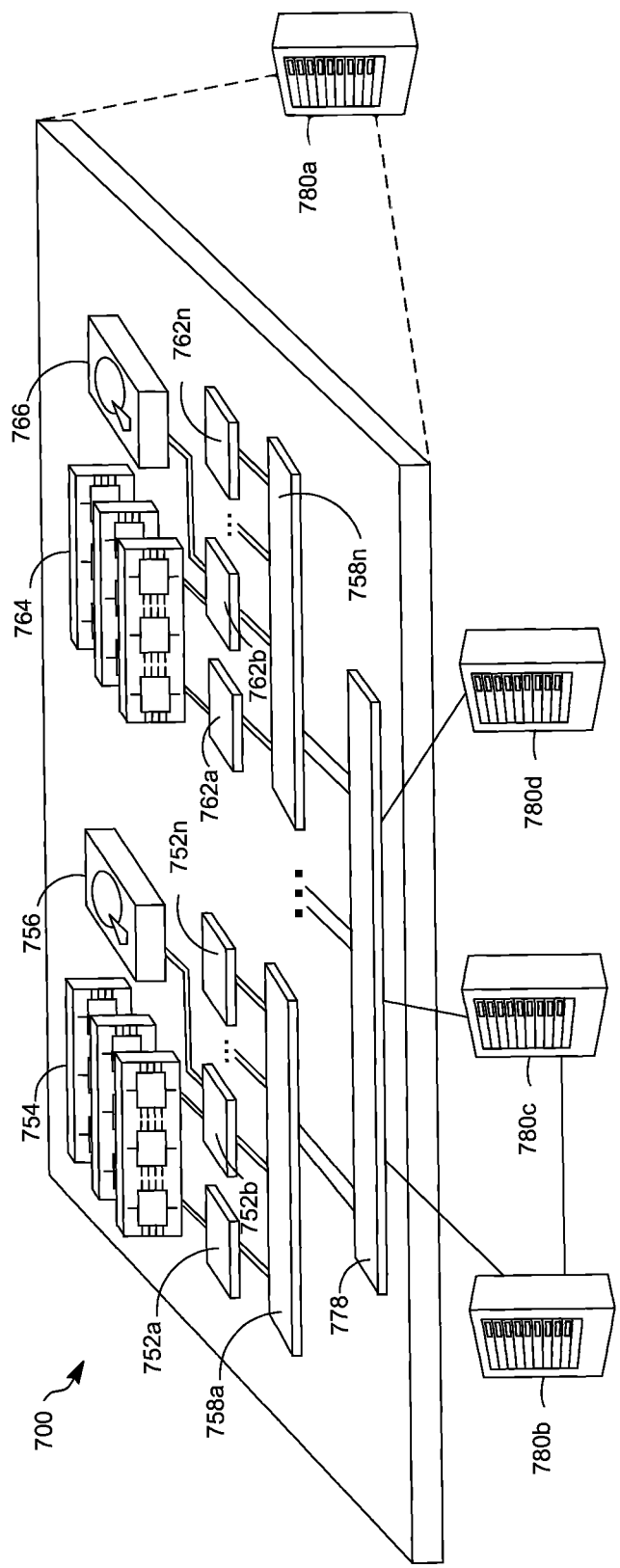
FIG. 7 is a diagram that illustrates an example of a distributed computer device that can be used to implement the described techniques.

FIG. 7 shows an example of a generic computer device 700, which may be computer 220 of FIG. 2, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 70 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a, 758b, . . . , 758n. Each rack may include one or more processors, such as processors 752a, 752B, . . . , 752n and 762a, 762b, . . . , 762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiples of computing device 700, connected.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a, 752b, . . . , 752n. Data structures, such as an index, may be stored, for example, across storage 756 and memory 754. Computing device 700 may include other components not shown, such as controllers, buses, input/output devices, communications modules, etc.

An entire system, such as environment 100, may be made up of multiples of computing device 700 communicating with each other. For example, device 780a may communicate with devices 780b, 780c, and 780d, and these may collectively be known as environment 100. As another example, environment 200 of FIG. 2 may include computing device 700 or multiples thereof. Some of the computing devices may be located geographically close to each other, and others may be located geographically distant. The layout of computing device 700 is an example only and the system may take on other layouts or configurations.

In some implementations, providing, based on the accuracy score, the candidate passage for display includes comparing the accuracy score to an accuracy score threshold; in response to the accuracy score being greater than the accuracy score threshold, displaying the candidate passage on the display; and in response to the accuracy score being less than the accuracy score threshold, not displaying the candidate passage on the display.

In some implementations, selecting the set of categories includes obtaining the query embedding generated from the query; producing a plurality of similarity scores by generating a respective similarity score based on a similarity measure between the query embedding and each of the plurality of category embeddings; and generating the set of categories by ranking the plurality of similarity scores. In some implementations, generating the respective similarity score includes, generating an inner product between the query embedding and that category embedding. In some implementations, the query embedding is obtained from a latent space, the latent space also including the item embeddings.

In some implementations, selecting the set of categories includes obtaining the user embedding generated from user feature data and user-item interaction data; producing a plurality of similarity scores by generating a respective similarity score based on a similarity measure between the user embedding and each of the plurality of category embeddings; and generating the set of categories by ranking the plurality of similarity scores. In some implementations, generating the respective score includes generating an inner product between the user embedding and that category embedding. In some implementations, the user embedding is obtained from a latent space, the latent space also including the item embeddings.

In some implementations, selecting the set of categories includes obtaining the query embedding and the user embedding; producing a plurality of first similarity scores based on a first similarity measure between the query embedding and each of the plurality of category embeddings; generating a set of interim category embeddings by ranking a specified number of the first similarity scores of the plurality of first similarity scores; producing a plurality of second similarity scores based on a second similarity measure between the query embedding and each of the set of interim category embeddings; and generating the set of categories by ranking the plurality of second similarity scores. In some implementations, the user embedding is generated from user feature data of user interaction data. In some implementations, generating the respective first similarity measure between the query embedding and a category embedding of the plurality of category embeddings includes generating an inner product between the query embedding and that category embedding. In some implementations, generating the respective second similarity measure of the user embedding and a category embedding of the set of interim category embeddings includes generating an inner product between the user embedding and that category embedding.

In some implementations, selecting the set of categories includes obtaining the query embedding and the user embedding; producing a plurality of first similarity scores based on a first similarity measure between the user embedding and each of the plurality of category embeddings; generating a set of interim category embeddings by ranking the first similarity scores; producing a plurality of second similarity scores based on a second similarity measure between the query embedding and each of the set of interim category embeddings; and generating the set of categories by ranking the plurality of second similarity scores. In some implementations, the user embedding is generated from user feature data or user interaction data. In some implementations, generating the respective first similarity measure between the user embedding and a category embedding of the plurality of category embeddings includes generating an inner product between the query embedding and that category embedding. In some implementations, generating the respective second similarity measure of the user embedding and a category embedding of the set of interim category embeddings includes generating an inner product between the query embedding and that category embedding.

In some implementations, aggregating the respective subset of item embeddings for each candidate category of the plurality of candidate categories includes generating, as the category embedding for that candidate category, a median of the item embeddings that correspond to that candidate category.

In some implementations, the method 500 further comprises obtaining a plurality of items corresponding to a candidate category of the plurality of candidate categories; producing a list of items by selecting a set of the plurality of items corresponding to the candidate category; and performing a mapping (i.e., via a supervised machine-learned function generated via, e.g., dual encoding) from the list of items to the item embeddings for the candidate category. In some implementations, obtaining the plurality of items corresponding to each of the plurality of candidate categories includes producing, as output of a search engine, the plurality of items corresponding to that candidate category by providing a search string into a search engine, the search string being based on an identifier (e.g., alpha-numeric) of that candidate category.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   generating a plurality of category embeddings by, for each candidate category of a plurality of candidate categories:
   selecting a respective subset of item embeddings that correspond to that candidate category, each of the respective subset of item embeddings being a vector of binary values and representing an item with which a user has interacted, and
   producing a category embedding for that candidate category by aggregating the respective subset of item embeddings; and
   in response to receiving a query from the user:
   producing a query result for the query;
   selecting a set of categories from the plurality of category embeddings based on a similarity between category embeddings for categories of the set of categories and at least one of a user embedding representing the user or a query embedding representing the query; and
   providing a recommendation of the set of categories to the user by sending the set of categories in addition to the query result to a user device.

2. The method as in claim 1, wherein selecting the set of categories includes:
   obtaining the query embedding generated from the query;
   producing a plurality of similarity scores by generating a respective similarity score based on a similarity measure between the query embedding and each of the plurality of category embeddings; and
   generating the set of categories by ranking the plurality of similarity scores and selecting at least some categories having highest-ranked similarity scores.

3. The method as in claim 2, wherein generating the respective similarity score includes:
   generating an inner product between the query embedding and the category embedding.

4. The method as in claim 2, wherein the query embedding is obtained from a latent space, the latent space also including the item embeddings.

5. The method as in claim 1, wherein selecting the set of categories includes:
   obtaining the user embedding generated from user feature data or user-item interaction data;
   producing a plurality of similarity scores by generating a respective similarity score based on a similarity measure between the user embedding and each of the plurality of category embeddings; and
   generating the set of categories by ranking the plurality of similarity scores and selecting at least some categories having highest-ranked similarity scores.

6. The method as in claim 5, wherein generating the respective similarity score includes:
   generating an inner product between the user embedding and the category embedding.

7. The method as in claim 5, wherein the user embedding is obtained from a latent space, the latent space also including the item embeddings.

8. The method as in claim 1, wherein selecting the set of categories includes:
   obtaining the query embedding and the user embedding;
   producing a plurality of first similarity scores based on a first similarity measure between the query embedding and each of the plurality of category embeddings;
   generating a set of interim category embeddings by selecting a specified number of categories with highest-ranked first similarity scores;
   producing a plurality of second similarity scores based on a second similarity measure between the query embedding and each of the set of interim category embeddings; and
   generating the set of categories by selecting categories with highest-ranked interim category embeddings.

9. The method as in claim 8, wherein the user embedding is generated from user feature data or user interaction data.

10. The method as in claim 8, wherein producing the plurality of first similarity scores based on the first similarity measure between the query embedding and each of the plurality of category embeddings includes:
    generating an inner product between the query embedding and a category embedding of the plurality of category embeddings.

11. The method as in claim 8, wherein producing the plurality of second similarity scores based on the second similarity measure between the query embedding and each of the set of interim category embeddings includes:
    generating an inner product between the user embedding and a category embedding of the plurality of category embeddings.

12. The method as in claim 1, wherein selecting the set of categories includes:
    obtaining the query embedding and the user embedding;
    producing a plurality of first similarity scores based on a first similarity measure between the user embedding and each of the plurality of category embeddings;
    generating a set of interim category embeddings by selecting a specified number of categories with highest-ranked first similarity scores;
    producing a plurality of second similarity scores based on a second similarity measure between the query embedding and each of the set of interim category embeddings; and
    generating the set of categories by selecting, categories having highest-ranked category embeddings.

13. The method as in claim 12, wherein the user embedding is generated from user feature data or user interaction data.

14. The method as in claim 1, wherein aggregating the respective subset of item embeddings for a candidate category of the plurality of candidate categories includes:
    generating, as the category embedding for the candidate category, a median of the item embeddings that correspond to the candidate category.

15. The method as in claim 1, further comprising:
    obtaining a plurality of items corresponding to a candidate category of the plurality of candidate categories;
    producing a list of items by selecting a set of the plurality of items corresponding to the candidate category; and
    performing a mapping from the list of items to the item embeddings for the candidate category.

16. The method as in claim 15, wherein obtaining the plurality of items corresponding to each of the plurality of candidate categories includes:
    producing, as output of a search engine, the plurality of items corresponding to that candidate category by providing a search string to the search engine, the search string being based on an identifier of that candidate category.

17. A computer program product comprising a nontransitory storage medium, the computer program product including code that, when executed by processing circuitry on which a search engine is configured to execute, causes the processing circuitry to perform a method, the method comprising:
- generating a plurality of category embeddings by, for each candidate category of a plurality of candidate categories:
  - selecting a respective subset of item embeddings that correspond to that candidate category, each of the respective subset of item embeddings being a vector of binary values and representing an item with which a user has interacted, and
  - producing a category embedding for that candidate category by aggregating the respective subset of item embeddings; and
- in response to receiving a query from the user:
  - producing a query result for the query;
  - selecting a set of categories from the plurality of category embeddings based on a similarity between category embeddings for categories of the set of categories and at least one of a user embedding representing the user or a query embedding representing the query; and
  - providing a recommendation of the set of categories to the user by sending the set of categories in addition to the query result to a user device.

18. An apparatus, the apparatus comprising:
memory; and
controlling circuitry coupled to the memory, the controlling circuitry being configured to:
- generate a plurality of category embeddings by, for each candidate category of a plurality of candidate categories:
  - selecting a respective subset of item embeddings that correspond to that candidate category, each of the respective subset of item embeddings being a vector of binary values and representing an item with which a user has interacted, and
  - producing a category embedding for that candidate category by aggregating the respective subset of item embeddings; and
- in response to receiving a query from the user:
  - producing a query result for the query;
  - select a set of categories based on a similarity between category embeddings for categories of the set of categories and at least one of a user embedding representing the user or a query embedding representing the query; and
  - provide a recommendation of the set of categories to the user by sending the set of categories in addition to the query result to a user device.

19. The apparatus as in claim 18, wherein the controlling circuitry configured to select the set of categories is further configured to:
- obtain the query embedding generated from the query;
- produce a plurality of similarity scores by generating a respective similarity score based on a similarity measure between the query embedding and each of the plurality of category embeddings; and
- generate the set of categories by ranking the plurality of similarity scores.

20. The apparatus as in claim 18, wherein the controlling circuitry configured to select the set of categories is further configured to:
- obtain the user embedding generated from user feature data or user-item interaction data;
- produce a plurality of similarity scores by generating a respective similarity score based on a similarity measure between the user embedding and each of the plurality of category embeddings; and
- generate the set of categories by ranking the plurality of similarity scores.

* * * * *